(12) United States Patent
Wells et al.

(10) Patent No.: US 8,874,949 B2
(45) Date of Patent: Oct. 28, 2014

(54) METHOD, APPARATUS, AND SYSTEM FOR ENERGY EFFICIENCY AND ENERGY CONSERVATION INCLUDING ENHANCED TEMPERATURE BASED VOLTAGE CONTROL

(75) Inventors: Ryan D. Wells, Folsom, CA (US); Uzi Sasson, Haifa (IL); Inder M. Sodhi, Folsom, CA (US); Sanjeev Jahagirdar, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 258 days.

(21) Appl. No.: 13/335,747

(22) Filed: Dec. 22, 2011

(65) Prior Publication Data

US 2012/0159216 A1 Jun. 21, 2012

(51) Int. Cl.
*G06F 1/26* (2006.01)
*G06F 1/32* (2006.01)
*G06F 1/20* (2006.01)

(52) U.S. Cl.
CPC .......... *G06F 1/26* (2013.01); *G06F 1/3296* (2013.01); *Y02B 60/1275* (2013.01); *G06F 1/206* (2013.01); *G06F 1/3206* (2013.01)
USPC ........... 713/322; 713/300; 713/320; 702/127; 702/132

(58) Field of Classification Search
USPC ........... 713/200, 320, 322, 300; 702/127, 132
See application file for complete search history.

(56) References Cited

U.S. PATENT DOCUMENTS

| | | | |
|---|---|---|---|
| 6,487,668 B2 * | 11/2002 | Thomas et al. ............... | 713/322 |
| 7,013,406 B2 | 3/2006 | Naveh et al. | |
| 7,076,672 B2 | 7/2006 | Naveh et al. | |
| 7,149,645 B2 | 12/2006 | Mangrulkar et al. | |
| 7,222,257 B1 | 5/2007 | Dibb | |
| 7,290,155 B2 | 10/2007 | George et al. | |
| 7,401,241 B2 | 7/2008 | Rotem et al. | |
| 7,953,993 B2 | 5/2011 | Allarey et al. | |
| 2002/0079951 A1 * | 6/2002 | Borkar et al. ................. | 327/534 |
| 2004/0003301 A1 * | 1/2004 | Nguyen ........................ | 713/300 |
| 2005/0030171 A1 * | 2/2005 | Liu et al. ....................... | 340/500 |
| 2006/0095798 A1 * | 5/2006 | Finkelstein et al. .......... | 713/300 |
| 2006/0143485 A1 * | 6/2006 | Naveh et al. .................. | 713/320 |
| 2006/0161375 A1 * | 7/2006 | Duberstein et al. ........... | 702/132 |
| 2008/0082285 A1 * | 4/2008 | Samaan et al. ................ | 702/118 |
| 2008/0155321 A1 * | 6/2008 | Riedlinger et al. ............ | 714/17 |
| 2008/0215901 A1 * | 9/2008 | Beard ........................... | 713/300 |
| 2010/0083009 A1 | 4/2010 | Rotem et al. | |
| 2010/0165304 A1 | 7/2010 | Ozawa | |
| 2010/0169609 A1 | 7/2010 | Finkelstein et al. | |
| 2011/0040940 A1 | 2/2011 | Wells et al. | |
| 2011/0055603 A1 * | 3/2011 | Wolfe ........................... | 713/320 |
| 2011/0126056 A1 * | 5/2011 | Kelleher et al. ............... | 714/42 |
| 2011/0225436 A1 * | 9/2011 | Beard ........................... | 713/310 |

\* cited by examiner

*Primary Examiner* — Vincent Tran
(74) *Attorney, Agent, or Firm* — Blakely, Sokoloff, Taylor & Zafman LLP

(57) ABSTRACT

Embodiments of systems, apparatuses, and methods for energy efficiency and energy conservation including enhanced temperature based voltage control are described. In one embodiment, an apparatus includes a processor and a controller coupled with the processor. In one embodiment, the controller receives a temperature measurement corresponding to a current temperature of the processor. In one embodiment, the controller further determines an adjustment to a voltage being applied to the processor based at least in part on the temperature measurement and a plurality of internal limits of the processor, wherein the determined adjustment to the voltage is based on an inverse temperature dependence relationship between at least one of an operating frequency and a voltage of the processor, and temperature. In one embodiment, the controller provides the determined adjustment to the voltage to a voltage regulator interface.

13 Claims, 11 Drawing Sheets

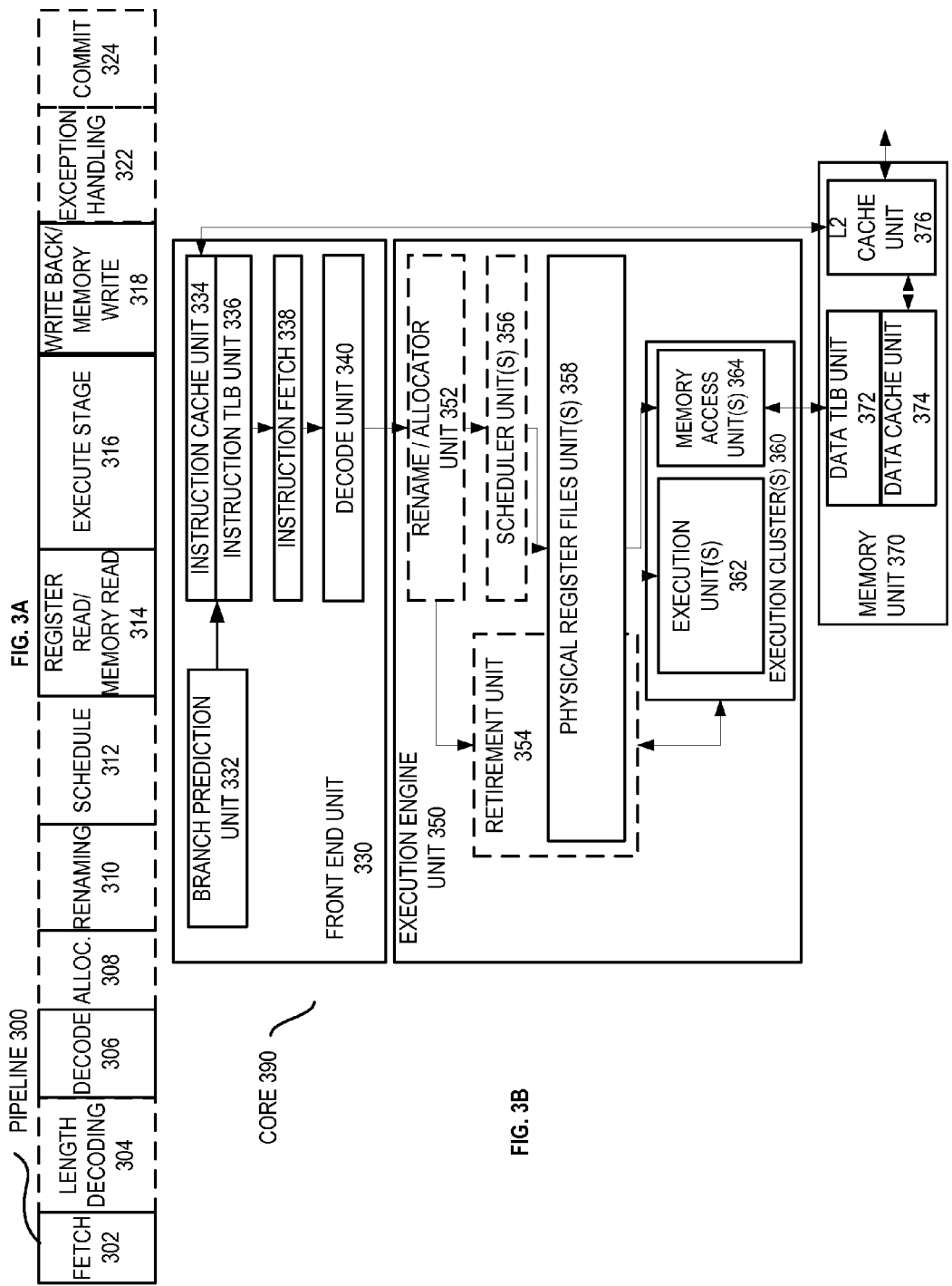

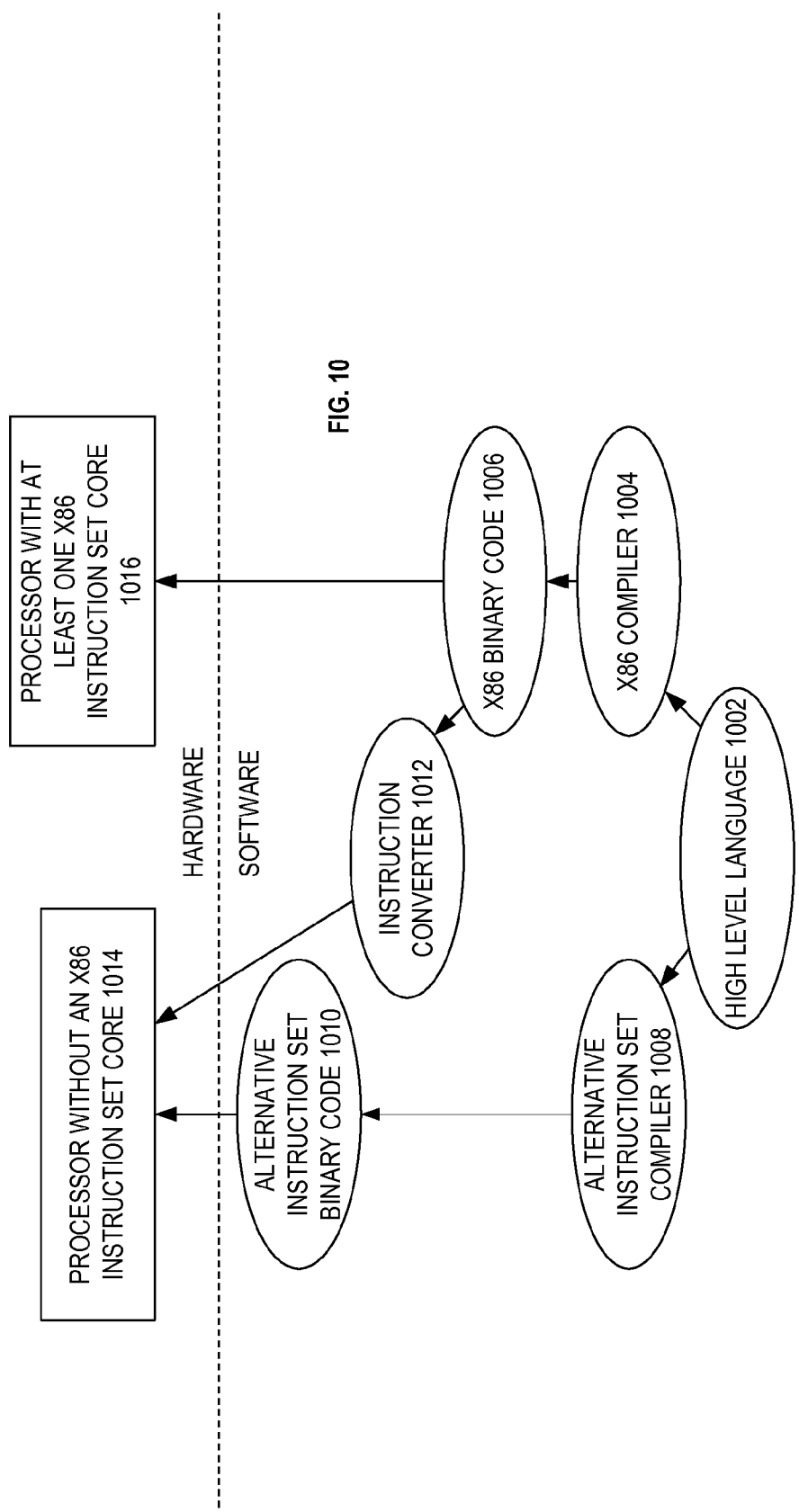

METHOD, APPARATUS, AND SYSTEM FOR ENERGY EFFICIENCY AND ENERGY CONSERVATION INCLUDING ENHANCED TEMPERATURE BASED VOLTAGE CONTROL

FIELD

This disclosure pertains to energy efficiency and energy conservation in integrated circuits, as well as code to execute thereon, and in particular but not exclusively, to utilizing inverse temperature dependence to dynamically adjust voltage applied to a processor to reduce power consumption.

BACKGROUND

Advances in semi-conductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, ultrabooks, tablets, mobile phones, processors, embedded systems, etc. become even more prevalent (from inclusion in the typical computer, automobiles, and televisions to biotechnology).

BRIEF DESCRIPTION OF THE DRAWINGS

The present invention is illustrated by way of example and not limitation in the figures of the accompanying drawings, in which like references indicate similar elements and in which:

FIG. 3A is a block diagram illustrating both an exemplary in-order pipeline and an exemplary register renaming, out-of-order issue/execution pipeline according to embodiments of the invention.

FIG. 3B is a block diagram illustrating both an exemplary embodiment of an in-order architecture core and an exemplary register renaming, out-of-order issue/execution architecture core to be included in a processor according to embodiments of the invention.

FIG. 10 is a block diagram contrasting the use of a software instruction converter to convert binary instructions in a source instruction set to binary instructions in a target instruction set according to embodiments of the invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Although the following embodiments are described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems, and may be also used in other devices, such as handheld devices, systems on a chip (SOC), and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Figure 1:
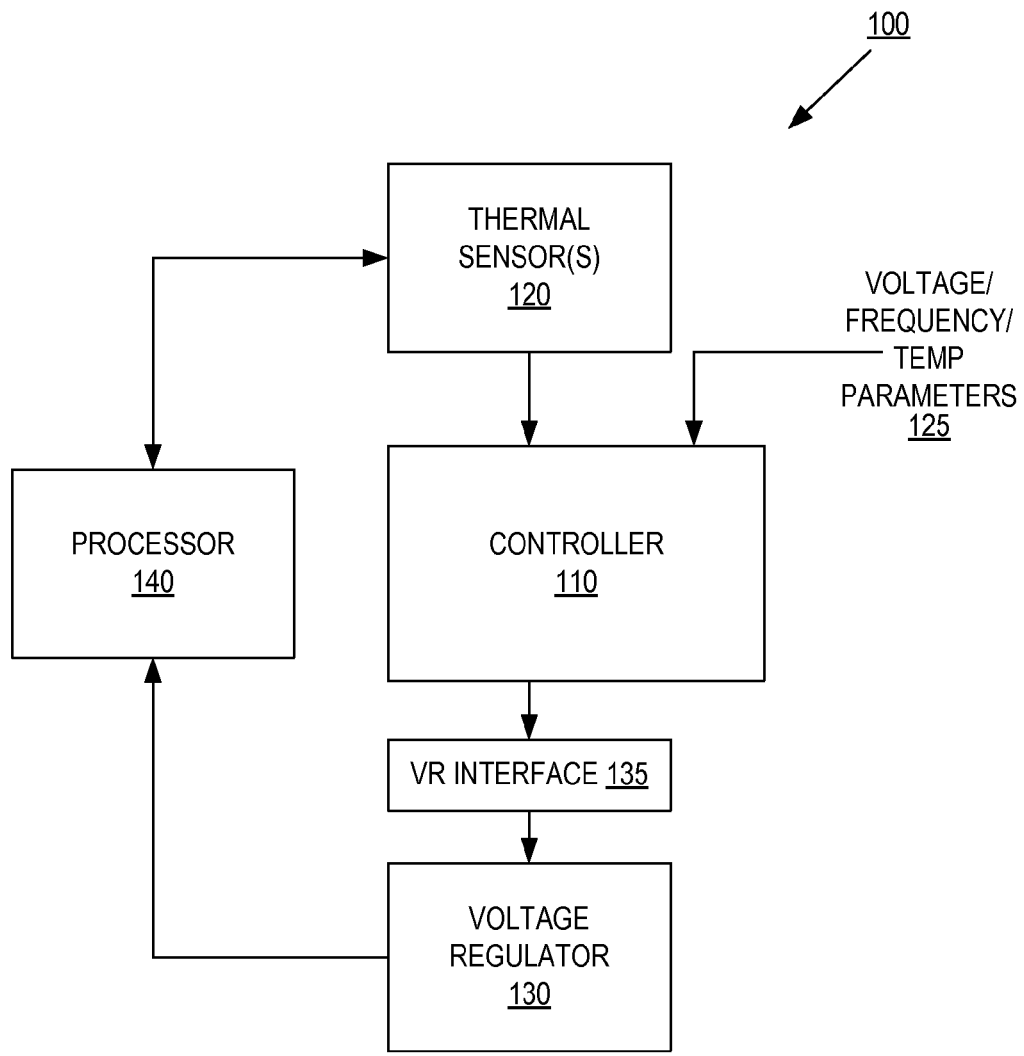
FIG. 1 illustrates a block diagram of a system for utilizing inverse temperature dependence to adjust voltage applied to a processor to reduce power consumption.

FIG. 1 illustrates a block diagram of a system 100 for utilizing inverse temperature dependence to adjust voltage applied to a processor to reduce power consumption. In one embodiment, the system 100 is part of a larger processing system, such as is illustrated below in FIGS. 6-9. In one embodiment, system 100 includes a controller 110, one or more thermal sensors 120, a voltage regulator 130, and a processor 140. In one embodiment, the controller 110, thermal sensors 120, and voltage regulator 130 are part of processor 140.

Figure 11A:
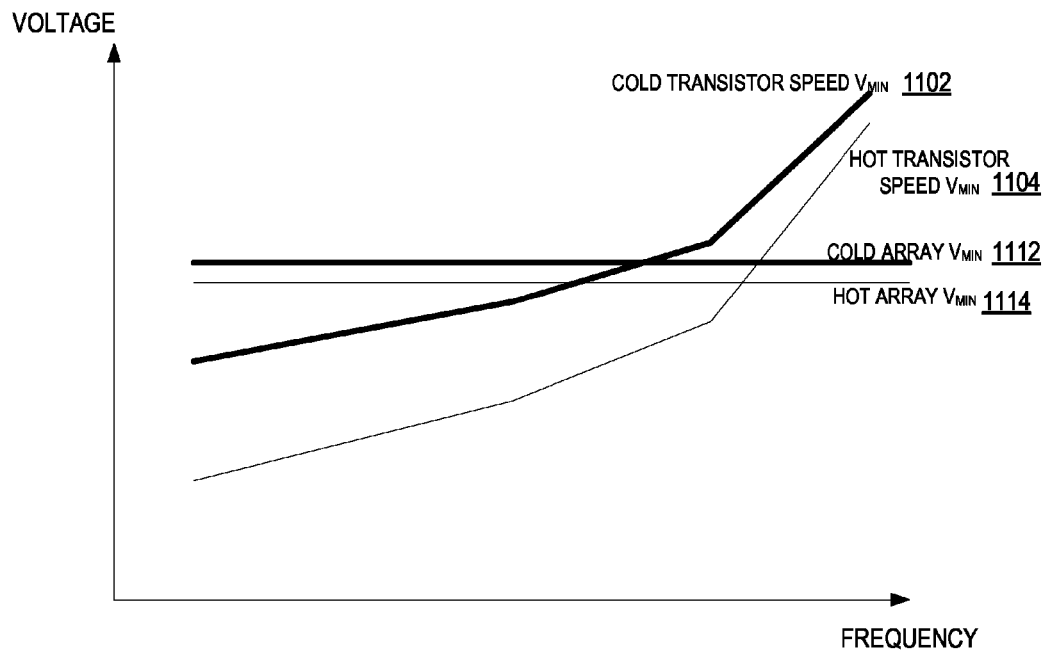
FIG. 11A illustrates a chart in accordance with an embodiment.

In one embodiment, the processor 140 may be a central processing unit (CPU), graphics processor, or other processor, that carries out the instructions to perform the arithmetic, logical, and input/output operations of the systems of FIGS. 1 and 6-9. In one embodiment, controller 110, which may be a microcontroller, microprocessor, or other processing unit, measures a current temperature of processor 140. In one embodiment, controller 110 measures the current temperature of processor 140 at periodical intervals. In one embodiment, and as discussed in greater detail below with respect to FIGS. 11A and 11B, controller may measure the current temperature of the processor as it applies to multiple internal voltage requirements, such as a transistor speed voltage requirement and a processor array voltage requirement. In one embodiment, the current temperature is a single temperature measurement that applies to all internal voltage constraints, such as the transistor speed voltage and processor array voltage requirements. However, as illustrated in FIG. 11A, the different internal voltage constraints like transistor speed and processor array voltage relationships may have different temperature dependence relationships.

In one embodiment, voltage is be added to processor 140 by voltage regulator 130 dynamically based on a current temperature and a desired operating frequency, or speed, of the processor 140. In one embodiment, transistors in processor 140 slow down as the temperature of the processor 140 decreases, thereby reducing the operating frequency of the processor. In order to maintain a desired operating frequency of processor 140, the voltage to be added to the processor 140 increases as temperature decreases, which forms an inverse temperature dependence between voltage and temperature. In one embodiment, controller 110 therefore adjusts the voltage it requests to voltage regulator (VR) interface 135 that causes voltage regulator 130 to adjust the voltage supplied to processor 140 based on a current temperature. In one embodiment, controller 110 makes voltage adjustments by adding extra voltage to processor 140 when it is needed, such as when the processor temperature lowers. Because the extra voltage is added to processor 140 when it is needed, and not on a worst case scenario model, voltage need not be applied when the processor 140 is hot thereby reducing power consumption by the processor 140, as well as reducing the overall power consumption by system 100 of FIG. 1 and the systems of FIGS. 6-9. Furthermore, energy leakage from the silicon of processor 140 is lower at lower temperatures (e.g., when the processor 140 is cold), thus the voltage added at the lower temperature is more efficiently utilized by processor 140.

In one embodiment, controller 110 utilizes a current temperature, one or more parameters of the processor 140, and a desired operating frequency, to determine a dynamic voltage adjustment. In one embodiment, controller 110 obtains the current temperature of processor 140 from one or more thermal sensor(s) 120. In one embodiment, thermal sensors 120 reports temperature data for each core of processor 140. In one embodiment, controller 110 further obtains voltage, frequency, and temperature parameters 125 of processor 140. In one embodiment, the parameters 125 describe the operating properties of processor 140, which were generated during manufacture and testing of the processor. In one embodiment, based on parameters 125, the current temperature of the processor 140 obtained from thermal sensor(s) 120, a desired operating frequency of the processor, as well as other internal limiters of processor 140, controller 110 decides on a voltage to be supplied to processor 140 for a current operating point. In one embodiment, the voltage is adjusted based on processor's 140 inverse dependence of operating frequency and temperature.

In one embodiment, controller 110 informs voltage regulator interface 135 of the determined voltage adjustment. In one embodiment, voltage regulator interface 135 utilizes one or more voltage control methods to move the processor to the determined voltage setting with voltage regulator 130. In one embodiment, voltage regulator interface 135 utilizes a voltage control method for controlling the voltage regulator 130, such as a serial voltage identification (SVID) interface for dynamically requesting different voltages to be applied to the processor 140 from a fully controllable SVID compliant voltage regulator 130. In another embodiment, voltage regulator 130 may be a less expensive semi-fixed voltage regulator, where VR interface 135 moves between several discrete voltage levels by toggling one or more wire connections between VR interface 135 and voltage regulator 130.

In one embodiment, controller 110 determines voltage adjustments based on cutoff temperature thresholds for voltage minimums. That is, when the temperature of processor 140 exceeds a given threshold temperature, voltage regulator 130 may apply a lower voltage. However, when the temperature of processor 140 is below a temperature threshold, voltage regulator 130 may apply a higher voltage. In one embodiment, voltage regulator 130 dynamically toggles the voltage higher or lower, based on a current temperature and a desired operating frequency, to maintain the processor's 140 operating characteristics. For example, FIG. 11A illustrates exemplary temperature threshold curves utilized by controller 110 when deciding what voltage should be applied to processor 140. FIG. 11A depicts a chart with frequency along the x-axis, and voltage along the y-axis. In one embodiment, the hot and cold threshold curves for minimum transistor speed voltage 1102, 1104 and minimum processor array voltage 1112, 1114 are illustrated. In the illustrated embodiment, the threshold curves may be based on processor 140 specifications determined at time of manufacture, testing, design specifications, etc. In one embodiment, controller 110 determines different voltage adjustments for transistor speed and processor array voltage minimums in order to select a single adjustment that will satisfy both minimums. In one embodiment, the separate handling optimizes power utilization and performance by processor 140 when the transistor speed and processor array have different inverse temperature dependence relationships, as illustrated.

Figure 11B:
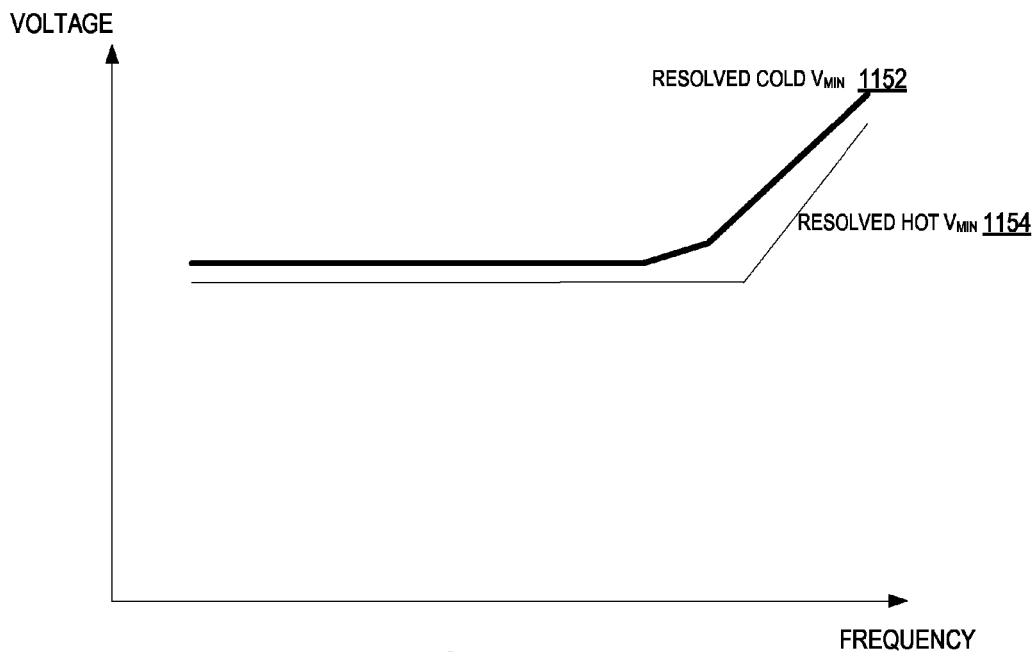
FIG. 11B illustrates a chart in accordance with an embodiment.

In another embodiment, the cold voltage curves and hot voltage curves for transistor speed and array can be resolved, as illustrated in FIG. 11B. In this embodiment, the curves are resolved by taking a maximum of the cold transistor speed $V_{min}$ curve 1102 and cold processor array $V_{min}$ curve 1112, as well as taking a maximum of the hot transistor speed $V_{min}$ curve 1104 and the hot processor array $V_{min}$ curve 1114 of FIG. 11A, to obtain the resolved cold $V_{min}$ curve 1152 and the resolved hot $V_{min}$ curve 1154 of FIG. 11B. If both transistor speed and processor array voltage minimums were to be combined into a single voltage/frequency curve and then adjusted with a combined ITD adjustment, the result would be a worst case voltage adjustment added to a worst case voltage minimum. By utilizing a worst case voltage adjustment added to a worst case voltage minimum, more voltage would be added to a processor than is needed resulting in energy usage inefficiencies. However, in one embodiment, controller 110 determines the final voltage required based on a baseline $V_{min}$ and inverse temperature dependence adjustment for transistor speed and processor array voltage separately, and then chooses the higher of those two as the final voltage for processor 140. In one embodiment, the final voltage chosen by controller 110 satisfies the four thresholds based on the two curves 1152, 1154 of FIG. 11A. In one embodiment, the result is a best case voltage adjustment that conserves energy supplied to processor 140.

In one embodiment, the controller 110 further performs dynamic adjustment of voltage applied to processor 140 when processor 140 is in an idle state. In one embodiment, controller 110 applies sufficient power to allow the registers of processor 140 to retain their state and a plurality of state variables stored within the registers, but not sufficient power to process operations. In one embodiment, controller 110 determines voltage adjustments to be applied to processor 140 for retention (i.e., a zero frequency with no activity), corresponding to the processor 140 remaining in an idle state. By toggling between several discrete voltage levels based on whether temperature is above or below a threshold, or adjusting voltage based on a continuous function of temperature, controller 110 need not add voltage to processor 140 for state retention purposes based on a worst case scenario for cold temperatures. Rather, controller 110 dynamically adjusts voltage based on the inverse temperature dependence and voltage minimums as discussed herein. In one embodiment, power consumption by processor 140 is therefore made more efficient even when processor is in an idle state.

In one embodiment, semi-fixed voltage regulators, which are normally used to supply one of several static voltage levels to a particular powerplane in processor 140 or a computer processing system (e.g., computer processing systems of FIGS. 6-9), may also be used to manage processor's 140 inverse temperature dependence. For example, a system agent power plane in processor 140 is typically supplied with one of several static voltage levels, but the system agent's voltage can be adjusted up/down based on temperature being above or below one or more discrete thresholds. Based on a given temperature and threshold value, controller 110 may adjust the voltage requested of VR interface 135 between discrete levels. In one embodiment, the adjustment made by voltage regulator interface 135 includes toggling one or more fixed wires of voltage regulator interface 135 so that voltage is turned high or low based on a current temperature of processor 140. In one embodiment, however, the system agent may be supplied with power according to the embodiments discussed herein.

Figure 2:
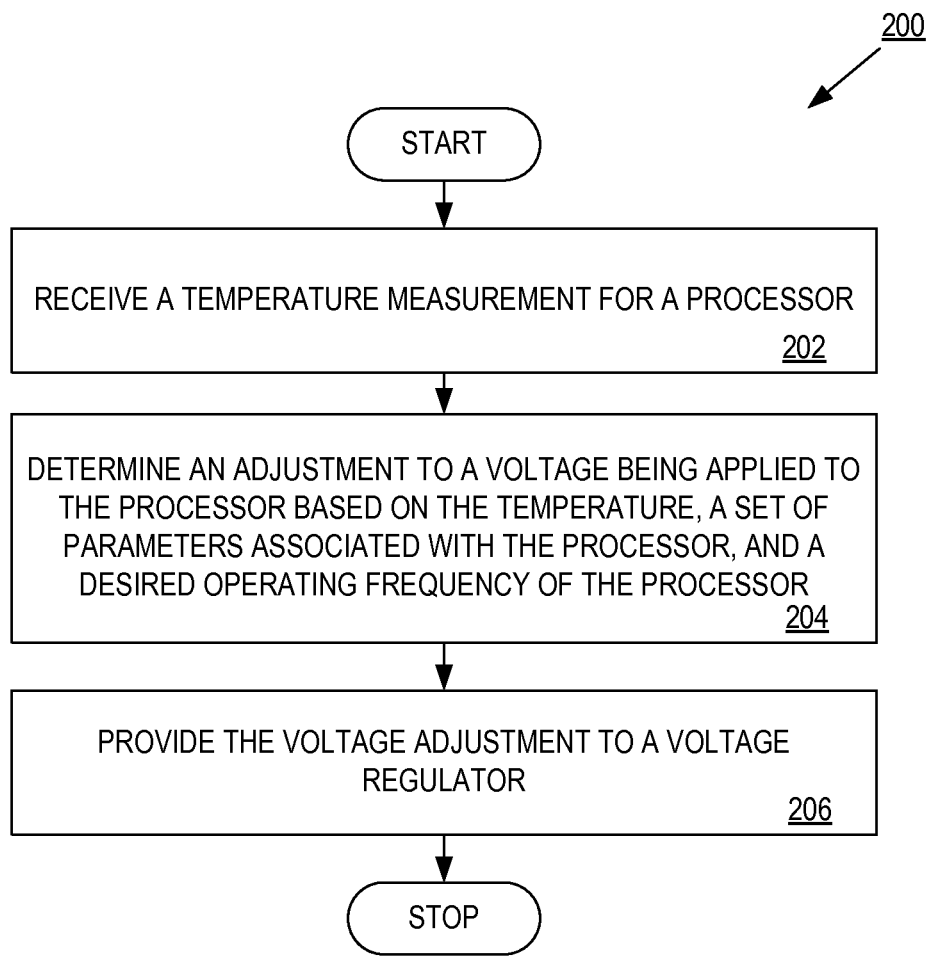
FIG. 2 illustrates one embodiment of a method for dynamically adjusting voltage based on a given temperature.

FIG. 2 illustrates one embodiment of a method 200 for dynamically adjusting voltage based on a given temperature. The method 200 is performed by processing logic that may comprise hardware (circuitry, dedicated logic, etc.), software (such as is run on a general purpose computer system or a dedicated machine), firmware, or a combination.

In one embodiment, the method begins with processing logic receiving a temperature measurement for a processor (processing block 202). In one embodiment, the temperature measurement is provided by a thermal sensor. In one embodiment, the temperature measurement corresponds to a current temperature of the processor. In one embodiment, the processor may be active. In another embodiment, the processor is in an idle state.

In one embodiment, processing logic determines an adjustment to a voltage being applied to the processor based at least in part on the temperature, a set of parameters associated with the processor, and a desired operating frequency of the processor (processing block 204). In one embodiment, the set of parameters are parameters corresponding to voltage, frequency, and temperature operating parameters that were determined during manufacturing and testing of the processor. In one embodiment, processing logic utilizes the set of parameters and a desired operating frequency to adjust voltage between an upper and a lower voltage threshold based on the current temperature. In one embodiment, the thresholds define a minimum voltage that should be applied to the processor in order for the processor to operate at a given frequency and temperature. FIGS. 11A and 11B illustrate exemplary $V_{min}$ threshold curves that may be utilized by processing logic.

In one embodiment, processing logic provides the voltage adjustment to a voltage regulator (processing block 206). In one embodiment, the voltage adjustment causes the voltage being applied to the processor to move from a current voltage to the voltage determined at processing block 204.

In the embodiments discussed herein, the dynamic voltage adjustment enables the more efficient utilization of power by a processor, as well as the processing systems in which the processors are placed. For example, the dynamic voltage adjustment discussed herein enables the addition of extra voltage to a processor when the processor cools down but does not apply it unnecessarily when the processor is hot. However, overall power consumption may not be affected as the higher voltage applied at the colder temperature is offset by the colder temperature because leakage power in the processor is reduced at the colder temperature.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 3A is a block diagram illustrating both an exemplary in-order pipeline and an exemplary register renaming, out-of-order issue/execution pipeline according to embodiments of the invention. FIG. 3B is a block diagram illustrating both an exemplary embodiment of an in-order architecture core and an exemplary register renaming, out-of-order issue/execution architecture core to be included in a processor according to embodiments of the invention. The solid lined boxes in FIGS. 3A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 3A, a processor pipeline 300 includes a fetch stage 302, a length decode stage 304, a decode stage 306, an allocation stage 308, a renaming stage 310, a scheduling (also known as a dispatch or issue) stage 312, a register read/ memory read stage 314, an execute stage 316, a write back/memory write stage 318, an exception handling stage 322, and a commit stage 324.

FIG. 3B shows processor core 390 including a front end unit 330 coupled to an execution engine unit 350, and both are coupled to a memory unit 370. The core 390 may be a reduced instruction set computing (RISC) core, a complex instruction set computing (CISC) core, a very long instruction word (VLIW) core, or a hybrid or alternative core type. As yet another option, the core 390 may be a special-purpose core, such as, for example, a network or communication core, compression engine, coprocessor core, general purpose computing graphics processing unit (GPGPU) core, graphics core, or the like.

The front end unit 330 includes a branch prediction unit 332 coupled to an instruction cache unit 334, which is coupled to an instruction translation lookaside buffer (TLB) 336, which is coupled to an instruction fetch unit 338, which is coupled to a decode unit 340. The decode unit 340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 390 includes a microcode ROM or other medium that stores microcode for certain macroinstructions (e.g., in decode unit 340 or otherwise within the front end unit 330). The decode unit 340 is coupled to a rename/allocator unit 352 in the execution engine unit 350.

The execution engine unit 350 includes the rename/allocator unit 352 coupled to a retirement unit 354 and a set of one or more scheduler unit(s) 356. The scheduler unit(s) 356 represents any number of different schedulers, including reservations stations, central instruction window, etc. The scheduler unit(s) 356 is coupled to the physical register file(s) unit(s) 358. Each of the physical register file(s) units 358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 358 comprises a vector registers unit, a write mask registers unit, and a scalar registers unit. These register units may provide architectural vector registers, vector mask registers, and general purpose registers. The physical register file(s) unit(s) 358 is overlapped by the retirement unit 354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 354 and the physical register file(s) unit(s) 358 are coupled to the execution cluster(s) 360. The execution cluster(s) 360 includes a set of one or more execution units 362 and a set of one or more memory access units 364. The execution units 362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 356, physical register file(s) unit(s) 358, and execution cluster(s) 360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 364). It should also be understood that where separate pipelines are used, one or more of these pipelines may be out-of-order issue/execution and the rest in-order.

The set of memory access units 364 is coupled to the memory unit 370, which includes a data TLB unit 372 coupled to a data cache unit 374 coupled to a level 2 (L2) cache unit 376. In one exemplary embodiment, the memory access units 364 may include a load unit, a store address unit, and a store data unit, each of which is coupled to the data TLB unit 372 in the memory unit 370. The instruction cache unit 334 is further coupled to a level 2 (L2) cache unit 376 in the memory unit 370. The L2 cache unit 376 is coupled to one or more other levels of cache and eventually to a main memory.

By way of example, the exemplary register renaming, out-of-order issue/execution core architecture may implement the pipeline 300 as follows: 1) the instruction fetch 338 performs the fetch and length decoding stages 302 and 304; 2) the decode unit 340 performs the decode stage 306; 3) the rename/allocator unit 352 performs the allocation stage 308 and renaming stage 310; 4) the scheduler unit(s) 356 performs the schedule stage 312; 5) the physical register file(s) unit(s) 358 and the memory unit 370 perform the register read/memory read stage 314; the execution cluster 360 perform the execute stage 316; 6) the memory unit 370 and the physical register file(s) unit(s) 358 perform the write back/memory write stage 318; 7) various units may be involved in the exception handling stage 322; and 8) the retirement unit 354 and the physical register file(s) unit(s) 358 perform the commit stage 324.

The core 390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 334/374 and a shared L2 cache unit 376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 4B:
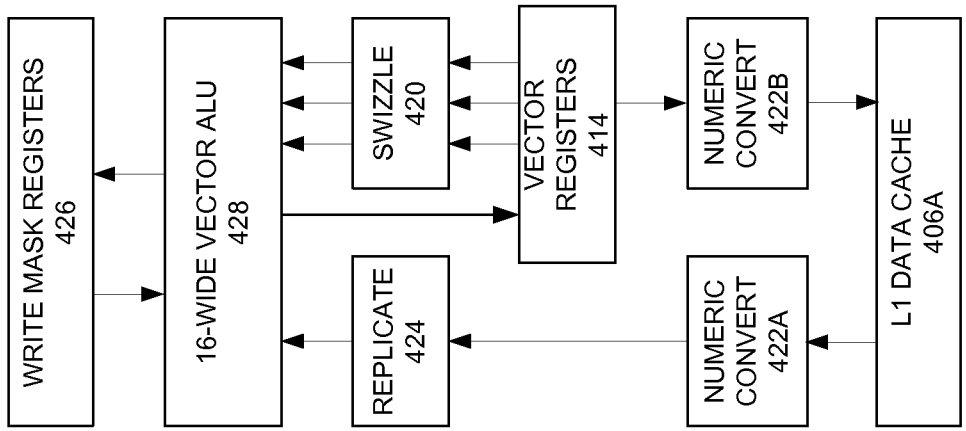
FIGS. 4A-B illustrate block diagrams of a more specific exemplary in-order core architecture.
Figure 4A:
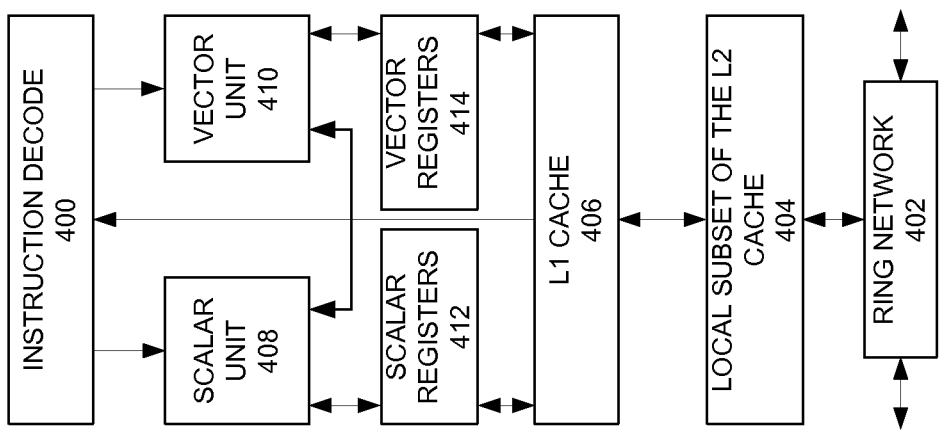

FIGS. 4A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 4A is a block diagram of a single processor core, along with its connection to the on-die interconnect network 402 and with its local subset of the Level 2 (L2) cache 404, according to embodiments of the invention. In one embodiment, an instruction decoder 400 supports the x86 instruction set with a packed data instruction set extension. An L1 cache 406 allows low-latency accesses to cache memory into the scalar and vector units. While in one embodiment (to simplify the design), a scalar unit 408 and a vector unit 410 use separate register sets (respectively, scalar registers 412 and vector registers 414) and data transferred between them is written to memory and then read back in from a level 1 (L1) cache 406, alternative embodiments of the invention may use a different approach (e.g., use a single register set or include a communication path that allow data to be transferred between the two register files without being written and read back).

The local subset of the L2 cache 404 is part of a global L2 cache that is divided into separate local subsets, one per processor core. Each processor core has a direct access path to its own local subset of the L2 cache 404. Data read by a processor core is stored in its L2 cache subset 404 and can be accessed quickly, in parallel with other processor cores accessing their own local L2 cache subsets. Data written by a processor core is stored in its own L2 cache subset 404 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 4B is an expanded view of part of the processor core in FIG. 4A according to embodiments of the invention. FIG. 4B includes an L1 data cache 406A part of the L1 cache 404, as well as more detail regarding the vector unit 410 and the vector registers 414. Specifically, the vector unit 410 is a 16-wide vector processing unit (VPU) (see the 16-wide ALU 428), which executes one or more of integer, single-precision float, and double-precision float instructions. The VPU supports swizzling the register inputs with swizzle unit 420, numeric conversion with numeric convert units 422A-B, and replication with replication unit 424 on the memory input. Write mask registers 426 allow predicating resulting vector writes.

Processor with Integrated Memory Controller and Graphics

Figure 5:
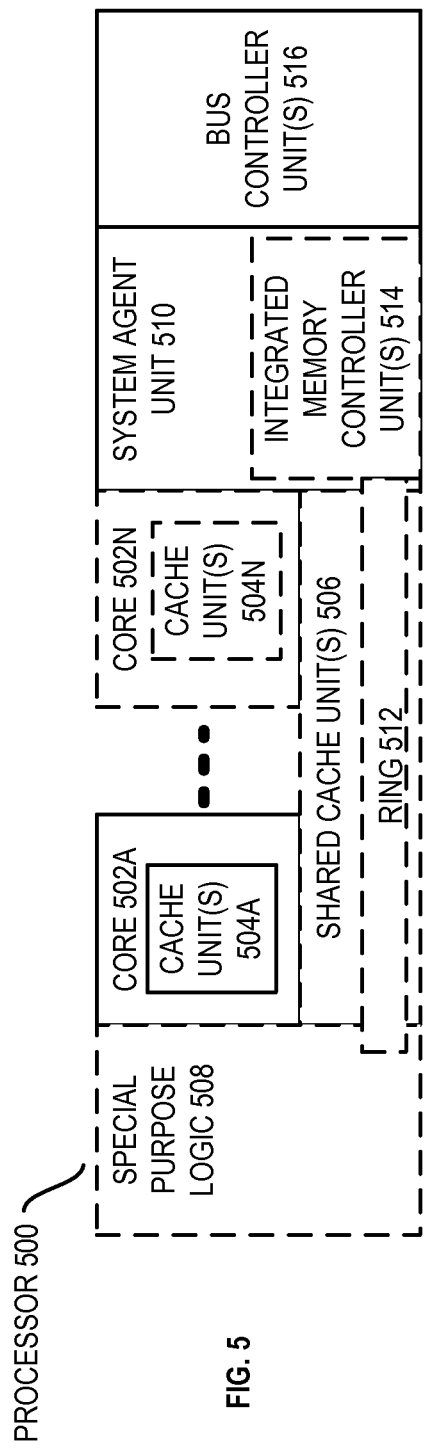
FIG. 5 is a block diagram of a processor.

FIG. 5 is a block diagram of a processor 500 that may have more than one core, may have an integrated memory controller, and may have integrated graphics according to embodiments of the invention. The solid lined boxes in FIG. 5 illustrate a processor 500 with a single core 502A, a system agent 510, a set of one or more bus controller units 516, while the optional addition of the dashed lined boxes illustrates an alternative processor 500 with multiple cores 502A-N, a set of one or more integrated memory controller unit(s) 514 in the system agent unit 510, and special purpose logic 508.

Thus, different implementations of the processor 500 may include: 1) a CPU with the special purpose logic 508 being integrated graphics and/or scientific (throughput) logic (which may include one or more cores), and the cores 502A-N being one or more general purpose cores (e.g., general purpose in-order cores, general purpose out-of-order cores, a combination of the two); 2) a coprocessor with the cores 502A-N being a large number of special purpose cores intended primarily for graphics and/or scientific (throughput); and 3) a coprocessor with the cores 502A-N being a large number of general purpose in-order cores. Thus, the processor 500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring based interconnect unit 512 interconnects the integrated graphics logic 508, the set of shared cache units 506, and the system agent unit 510/integrated memory controller unit(s) 514, alternative embodiments may use any number of well-known techniques for interconnecting such units. In one embodiment, coherency is maintained between one or more cache units 506 and cores 502-A-N.

In some embodiments, one or more of the cores 502A-N are capable of multi-threading. The system agent 510 includes those components coordinating and operating cores 502A-N. The system agent unit 510 may include for example a power control unit (PCU) and a display unit. The PCU may be or include logic and components needed for regulating the power state of the cores 502A-N and the integrated graphics logic 508. The display unit is for driving one or more externally connected displays.

The cores 502A-N may be homogenous or heterogeneous in terms of architecture instruction set; that is, two or more of the cores 502A-N may be capable of execution the same instruction set, while others may be capable of executing only a subset of that instruction set or a different instruction set.

Exemplary Computer Architectures

FIGS. 6-9 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 6:
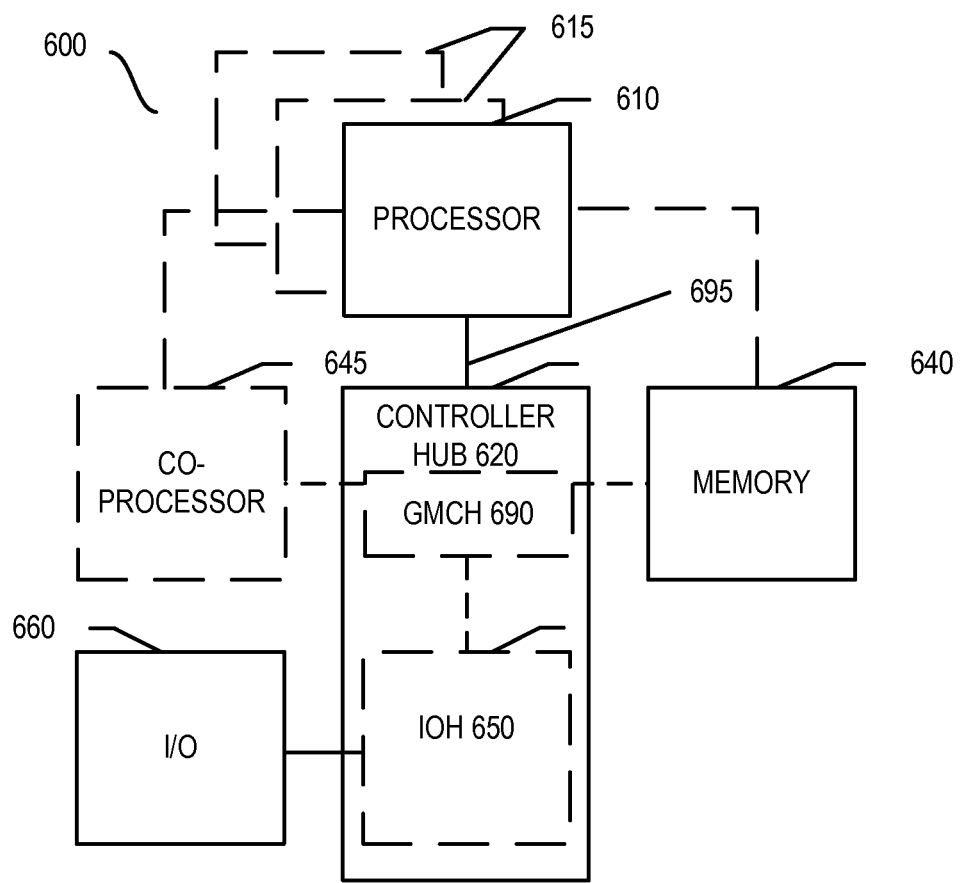
FIGS. 6-9 are block diagrams of exemplary computer architectures.

Referring now to FIG. 6, shown is a block diagram of a system 600 in accordance with one embodiment of the present invention. The system 600 may include one or more processors 610, 615, which are coupled to a controller hub 620. In one embodiment the controller hub 620 includes a graphics memory controller hub (GMCH) 690 and an Input/Output Hub (IOH) 650 (which may be on separate chips); the GMCH 690 includes memory and graphics controllers to which are coupled memory 640 and a coprocessor 645; the IOH 650 is couples input/output (I/O) devices 660 to the GMCH 690. Alternatively, one or both of the memory and graphics controllers are integrated within the processor (as described herein), the memory 640 and the coprocessor 645 are coupled directly to the processor 610, and the controller hub 620 in a single chip with the IOH 650.

The optional nature of additional processors 615 is denoted in FIG. 6 with broken lines. Each processor 610, 615 may include one or more of the processing cores described herein and may be some version of the processor 500.

The memory 640 may be, for example, dynamic random access memory (DRAM), phase change memory (PCM), or a combination of the two. For at least one embodiment, the controller hub 620 communicates with the processor(s) 610, 615 via a multi-drop bus, such as a frontside bus (FSB), point-to-point interface such as QuickPath Interconnect (QPI), or similar connection 695.

In one embodiment, the coprocessor 645 is a special-purpose processor, such as, for example, a high-throughput MIC processor, a network or communication processor, compression engine, graphics processor, GPGPU, embedded processor, or the like. In one embodiment, controller hub 620 may include an integrated graphics accelerator.

There can be a variety of differences between the physical resources 610, 615 in terms of a spectrum of metrics of merit including architectural, microarchitectural, thermal, power consumption characteristics, and the like.

In one embodiment, the processor 610 executes instructions that control data processing operations of a general type. Embedded within the instructions may be coprocessor instructions. The processor 610 recognizes these coprocessor instructions as being of a type that should be executed by the attached coprocessor 645. Accordingly, the processor 610 issues these coprocessor instructions (or control signals representing coprocessor instructions) on a coprocessor bus or other interconnect, to coprocessor 645. Coprocessor(s) 645 accept and execute the received coprocessor instructions.

Figure 7:
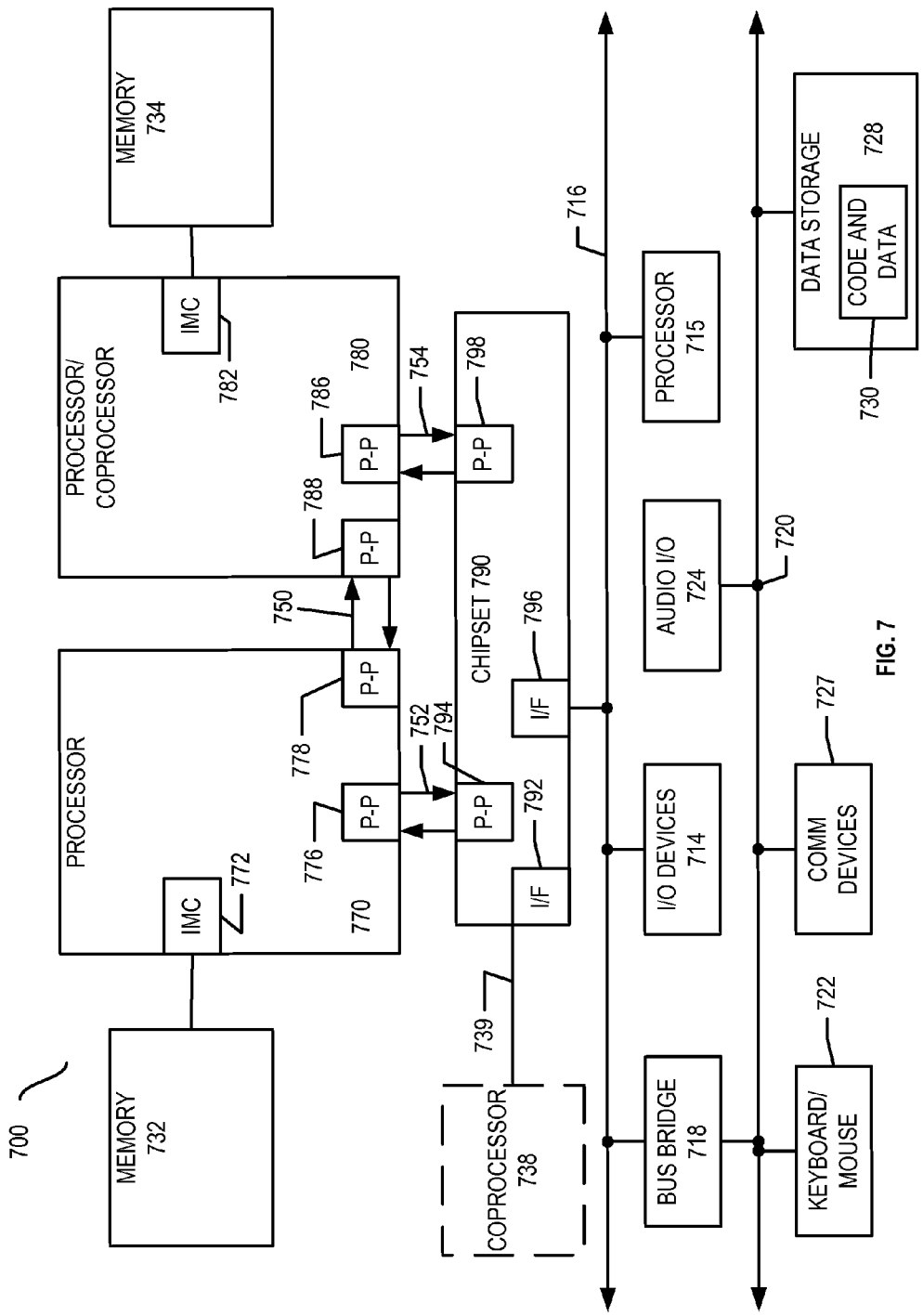

Referring now to FIG. 7, shown is a block diagram of a first more specific exemplary system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 500. In one embodiment of the invention, processors 770 and 780 are respectively processors 610 and 615, while coprocessor 738 is coprocessor 645. In another embodiment, processors 770 and 780 are respectively processor 610 coprocessor 645.

Processors 770 and 780 are shown including integrated memory controller (IMC) units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may optionally exchange information with the coprocessor 738 via a high-performance interface 739. In one embodiment, the coprocessor 738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, one or more additional processor(s) 715, such as coprocessors, high-throughput MIC processors, GPGPU's, accelerators (such as, e.g., graphics accelerators or digital signal processing (DSP) units), field programmable gate arrays, or any other processor, are coupled to first bus 716. In one embodiment, second bus 720 may be a low pin count (LPC) bus. Various devices may be coupled to a second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to the second bus 720. Note that other architectures are possible. For example, instead of the point-to-point architecture of FIG. 7, a system may implement a multi-drop bus or other such architecture.

Figure 8:
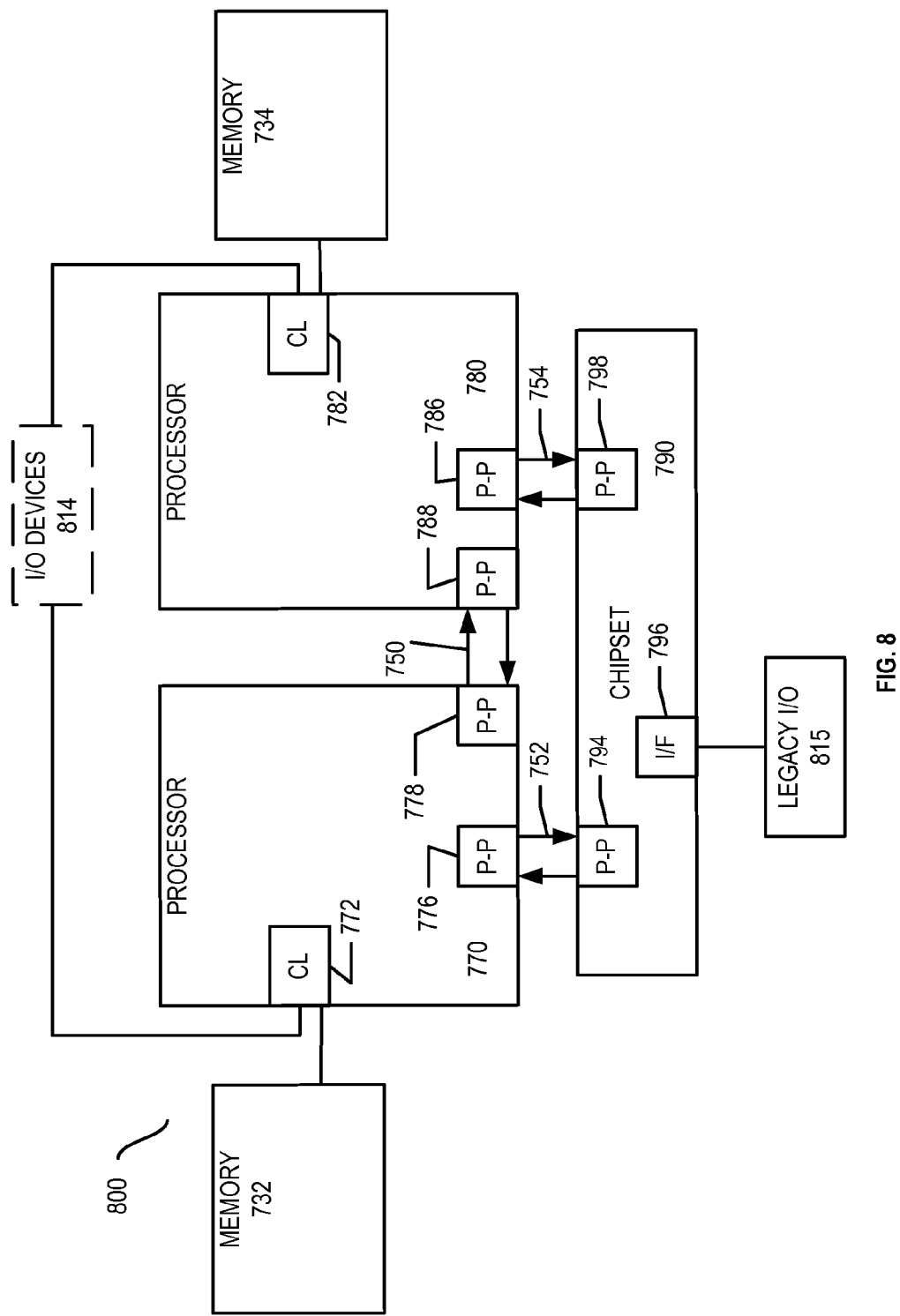

Referring now to FIG. 8, shown is a block diagram of a second more specific exemplary system 800 in accordance with an embodiment of the present invention Like elements in FIGS. 7 and 8 bear like reference numerals, and certain aspects of FIG. 7 have been omitted from FIG. 8 in order to avoid obscuring other aspects of FIG. 8.

FIG. 8 illustrates that the processors 770, 780 may include integrated memory and I/O control logic ("CL") 772 and 782, respectively. Thus, the CL 772, 782 include integrated memory controller units and include I/O control logic. FIG. 8 illustrates that not only are the memories 732, 734 coupled to the CL 772, 782, but also that I/O devices 814 are also coupled to the control logic 772, 782. Legacy I/O devices 815 are coupled to the chipset 790.

Figure 9:
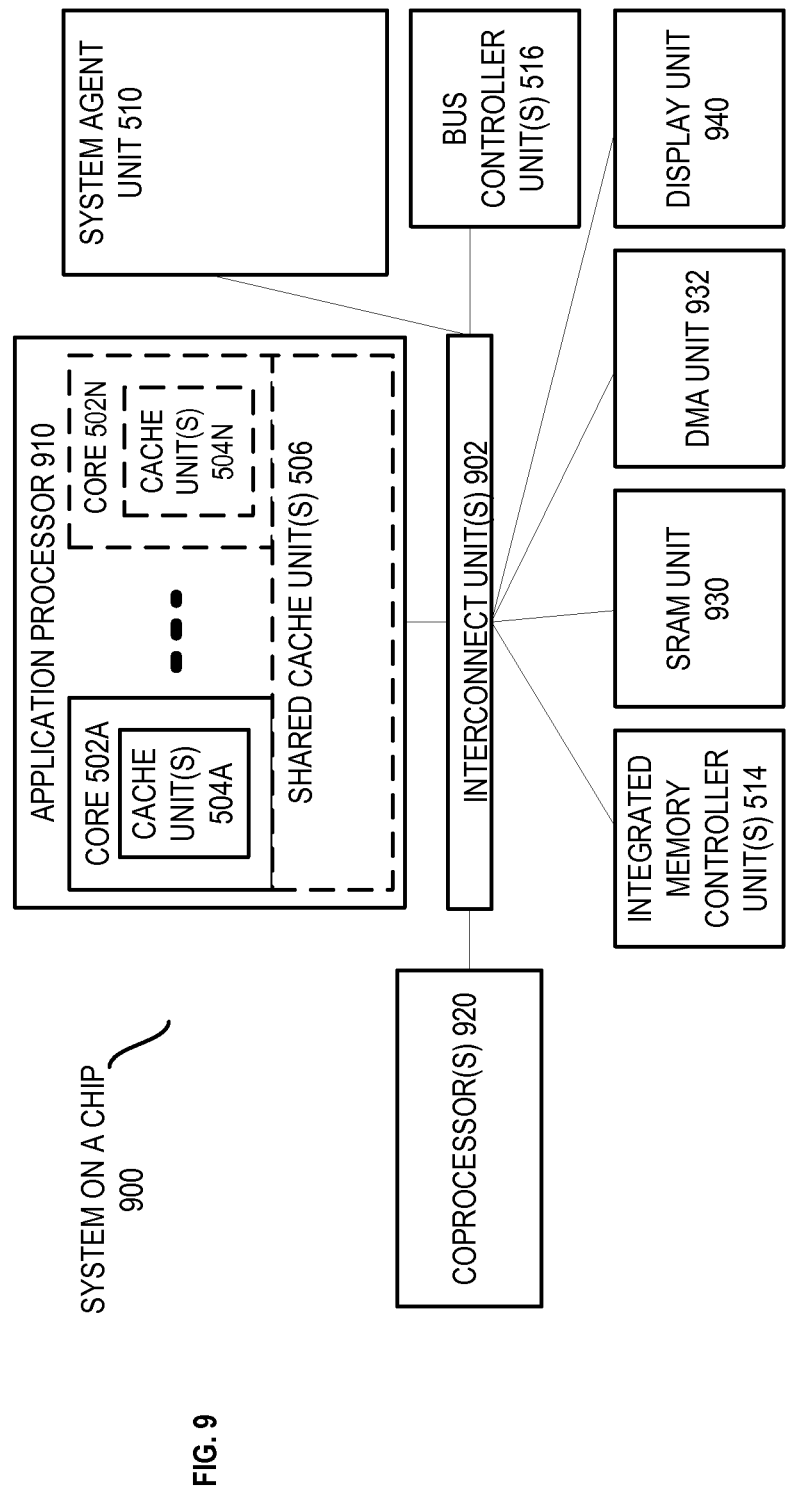

Referring now to FIG. 9, shown is a block diagram of a SoC 900 in accordance with an embodiment of the present invention. Similar elements in FIG. 5 bear like reference numerals. Also, dashed lined boxes are optional features on more advanced SoCs. In FIG. 9, an interconnect unit(s) 902 is coupled to: an application processor 910 which includes a set of one or more cores 202A-N and shared cache unit(s) 506; a system agent unit 510; a bus controller unit(s) 516; an integrated memory controller unit(s) 514; a set or one or more coprocessors 920 which may include integrated graphics logic, an image processor, an audio processor, and a video processor; an static random access memory (SRAM) unit

930; a direct memory access (DMA) unit 932; and a display unit 940 for coupling to one or more external displays. In one embodiment, the coprocessor(s) 920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 730 illustrated in FIG. 7, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 10 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 10 shows a program in a high level language 1002 may be compiled using an x86 compiler 1004 to generate x86 binary code 1006 that may be natively executed by a processor with at least one x86 instruction set core 1016. The processor with at least one x86 instruction set core 1016 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1004 represents a compiler that is operable to generate x86 binary code 1006 (e.g., object code) that can, with or without additional linkage processing, be executed on the processor with at least one x86 instruction set core 1016. Similarly, FIG. 10 shows the program in the high level language 1002 may be compiled using an alternative instruction set compiler 1008 to generate alternative instruction set binary code 1010 that may be natively executed by a processor without at least one x86 instruction set core 1014 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1012 is used to convert the x86 binary code 1006 into code that may be natively executed by the processor without an x86 instruction set core 1014. This converted code is not likely to be the same as the alternative instruction set binary code 1010 because an instruction converter capable of this is difficult to make; however, the converted code will accomplish the general operation and be made up of instructions from the alternative instruction set. Thus, the instruction converter 1012 represents software, firmware, hardware, or a combination thereof that, through emulation, simulation or any other process, allows a processor or other electronic device that does not have an x86 instruction set processor or core to execute the x86 binary code 1006.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below.

What is claimed is:

1. An apparatus for efficient energy consumption comprising:
   a processor
   a controller coupled with the processor to
      receive a temperature measurement corresponding to a current temperature of the processor,
      determine an adjustment to a voltage being applied to the processor based at least in part on the temperature measurement and a plurality of internal limits of the processor, wherein the determined adjustment to the voltage is based on an inverse temperature dependence relationship between at least one of an operating frequency and a voltage of the processor, and temperature, wherein the voltage to the processor is increased as temperature decreases and wherein the controller to determine separate voltage adjustment values for each of the plurality of internal limits of the processor comprising a transistor speed voltage minimum and a processor array voltage minimum and choose a single voltage adjustment from among the separate voltage adjustment values to be provided to a voltage regulator interface, and
      provide the determined adjustment to the voltage to voltage regulator interface; and
   a voltage regulator coupled to the voltage regulator interface to provide voltage to the processor.

2. The apparatus of claim 1, wherein the determined adjustment to the voltage is further based on a set of operating parameters associated with the processor and a desired operating frequency of the processor.

3. The apparatus of claim 1, wherein the processor is to be in an idle state, and the determined voltage adjustment to adjust a voltage being applied to the processor to enable the processor to retain a plurality of state variables.

4. The apparatus of claim 1, wherein the controller to choose between several discrete voltage levels based on whether the current temperature is above or below a temperature threshold.

5. The apparatus of claim 4, wherein the voltage regulator interface to move between a plurality of discrete voltage levels by toggling one or more wire connections between voltage regulator interface and a semi-fixed voltage regulator.

6. A method comprising:
   receiving a temperature measurement corresponding to a current temperature of a processor;
   determining an adjustment to a voltage being applied to the processor based at least in part on the temperature measurement and a plurality of internal limits of the processor, wherein the determined adjustment to the voltage is based on an inverse temperature dependence relationship between at least one of an operating frequency and a voltage of the processor, and temperature, wherein the voltage to the processor is increased as temperature decreases, wherein the processor is in an idle state, and the determined voltage adjustment adjusts a current voltage being applied to the processor to enable the processor to retain a plurality of state variables, wherein a controller determines separate voltage adjustment values for each of a plurality of internal limits of the processor and chooses a single voltage adjustment from among the separate voltage adjustment values to be provided to the voltage regulator interface and wherein the plurality of internal limits comprise a transistor speed voltage minimum and a processor array voltage minimum; and
   providing the determined adjustment to the voltage to a voltage regulator interface; and
   adjusting the voltage supplied to the processor.

7. The method of claim 6, wherein the determined adjustment to the voltage is further based on a set of operating parameters associated with the processor and a desired operating frequency of the processor.

8. The method of claim 6, further comprising:
   choosing between several discrete voltage levels based on whether the current temperature is above or below a temperature threshold.

9. The method of claim 8, wherein the voltage regulator interface moves between a plurality of discrete voltage levels by toggling one or more wire connections between voltage regulator interface and a semi-fixed voltage regulator.

10. A non-transitory computer readable storage medium including instructions that, when executed by a processing system, cause the processing system to perform a method comprising:
    receiving a temperature measurement corresponding to a current temperature of a processor;
    determining an adjustment to a voltage being applied to the processor based at least in part on the temperature measurement and a plurality of internal limits of the processor, wherein the determined adjustment to the voltage is based on an inverse temperature dependence relationship between at least one of an operating frequency and a voltage of the processor, and temperature, wherein the voltage to the processor is increased as temperature decreases and wherein the controller to determine separate voltage adjustment values for each of the plurality of internal limits of the processor comprising a transistor speed voltage minimum and a processor array voltage minimum and choose a single voltage adjustment from among the separate voltage adjustment values to be provided to a voltage regulator interface; and
    providing the determined adjustment to the voltage to the voltage regulator interface; and
    adjusting the voltage supplied to the processor.

11. The computer readable storage medium of claim 10, wherein the processor is in an idle state, and the determined voltage adjustment adjusts a current voltage being applied to the processor to enable the processor to retain a plurality of state variables.

12. The computer readable storage medium of claim 10, further comprising:
    choosing between several discrete voltage levels based on whether the current temperature is above or below a temperature threshold.

13. The computer readable storage medium of claim 12, wherein the voltage regulator interface moves between a plurality of discrete voltage levels by toggling one or more wire connections between voltage regulator interface and a semi-fixed voltage regulator.

* * * * *